April 4, 1944.　　　H. F. WATKINS　　　2,345,843
FRUIT JUICING MACHINE
Filed March 28, 1942　　　8 Sheets-Sheet 1

Fig.1

INVENTOR.
Harold F. Watkins
BY
Webster & Webster
ATTORNEYS

April 4, 1944.　　　　H. F. WATKINS　　　　2,345,843
FRUIT JUICING MACHINE
Filed March 28, 1942　　　　8 Sheets-Sheet 2

*Fig. 2*

INVENTOR.
Harold F. Watkins
BY
*Webster Webster*
ATTORNEYS

April 4, 1944.　　　H. F. WATKINS　　　2,345,843
FRUIT JUICING MACHINE
Filed March 28, 1942　　　8 Sheets-Sheet 5

INVENTOR.
Harold F. Watkins
BY
ATTORNEYS

April 4, 1944.   H. F. WATKINS   2,345,843
FRUIT JUICING MACHINE
Filed March 28, 1942   8 Sheets-Sheet 6

Fig. 6

INVENTOR.
Harold F. Watkins
BY
ATTORNEYS

April 4, 1944.  H. F. WATKINS  2,345,843
FRUIT JUICING MACHINE
Filed March 28, 1942  8 Sheets-Sheet 7

INVENTOR.
Harold F. Watkins
BY
ATTORNEYS

April 4, 1944.　　　　H. F. WATKINS　　　　2,345,843
FRUIT JUICING MACHINE
Filed March 28, 1942　　　8 Sheets-Sheet 8

Fig. 12

INVENTOR.
Harold F. Watkins
BY
*Webster & Webster*
ATTORNEYS

Patented Apr. 4, 1944

2,345,843

UNITED STATES PATENT OFFICE 2,345,843

FRUIT JUICING MACHINE

Harold F. Watkins, Oakland, Calif.

Application March 28, 1942, Serial No. 436,557

12 Claims. (Cl. 146—3)

This invention relates to machines for extracting juice from fruits, and particularly substantially spherical citrus fruits, such as oranges; the present invention representing improvements over the structures of my previous patents, Nos. 2,040,114, dated May 12, 1936; 2,147,870, dated February 21, 1939; and 2,181,442 dated November 28, 1939.

The principal invention deals particularly with the mechanism for transferring the halved fruit from the initial supporting cone to the juicing burrs, and the major object of this invention is to provide a mechanism for the purpose so constructed that it will handle fruit of somewhat widely different diameters without any adjustment being necessary, so that an assortment of what is known as "juice oranges" may be run through the machine without requiring an initial grading of the oranges for size.

The mechanism whereby this is effected includes a novel form of expanding and contracting link, and a novel form of fruit-cup mounting arms, so arranged the fruit halves in the cups will be transferred from the level of the supporting cone to the lower level of the juicing burrs, while being maintained in the same facing relation to each other. This enables the fruit to be juiced by oppositely disposed burrs mounted on a common shaft and thus easily driven in common.

Another object is to provide a simple and improved form of unitary drive connection means between the cutting knife, the fruit supporting cone, and the fruit transfer arms, so arranged that the synchronized movement of these different parts are accomplished with the use of a single rotary cam member. As a result of the various novel features and improvements above outlined, and as will be more clearly evident from the following specification, the construction of the machine as a whole, with respect to such features, is simplified over what was previously necessary, and greater compactness and ruggedness is obtained.

These objects I accomplish by means of such structure and relative arrangement of parts as will fully appear by a perusal of the following specification and claims.

In the drawings similar characters of reference indicate corresponding parts in the several views.

Referring now more particularly to the characters of reference on the drawings, the machine comprises a housing 1 having a transverse back wall 2 beyond which is a relatively narrow extension housing 3 having parallel sidewalls, and the top of which is a considerable distance below the top of the housing 1.

Journaled in and projecting through the wall 2 in close transversely spaced relation are shafts 4, disposed in overhanging relation to the extension 3. These shafts at their rear end are rigidly connected to fruit locating truncated cone-halves 5 into which the individual fruits, indicated at 6, are deposited in timed relation to the operating of the cutting and juicing mechanism by suitable means, such as shown for instance in my Patent No. 2,181,442.

Rearwardly of the cone unit, a knife 7 is mounted in a vertical plane centrally between and above the truncated cone halves (which are spaced somewhat from each other), the knife being thus parallel to the shafts 4 and being fixed at its lower end on a transverse shaft 8 journaled in the extension 3. This knife has a forwardly projecting point 9 intermediate its ends, disposed so that when the knife swings down and through the fruit, the point passes substantially through the center of the fruit when at the bottom of the same.

A pinion 10 is secured on the shaft 8 which is engaged by a depending vertical rack 11 at its lower end and is engaged by another pinion 12 disposed in a plane at right angles to the pinion 10 and mounted on a shaft 13 projecting through the extension 3 and the back wall 2 for operation, as will be seen later.

Figure 12:
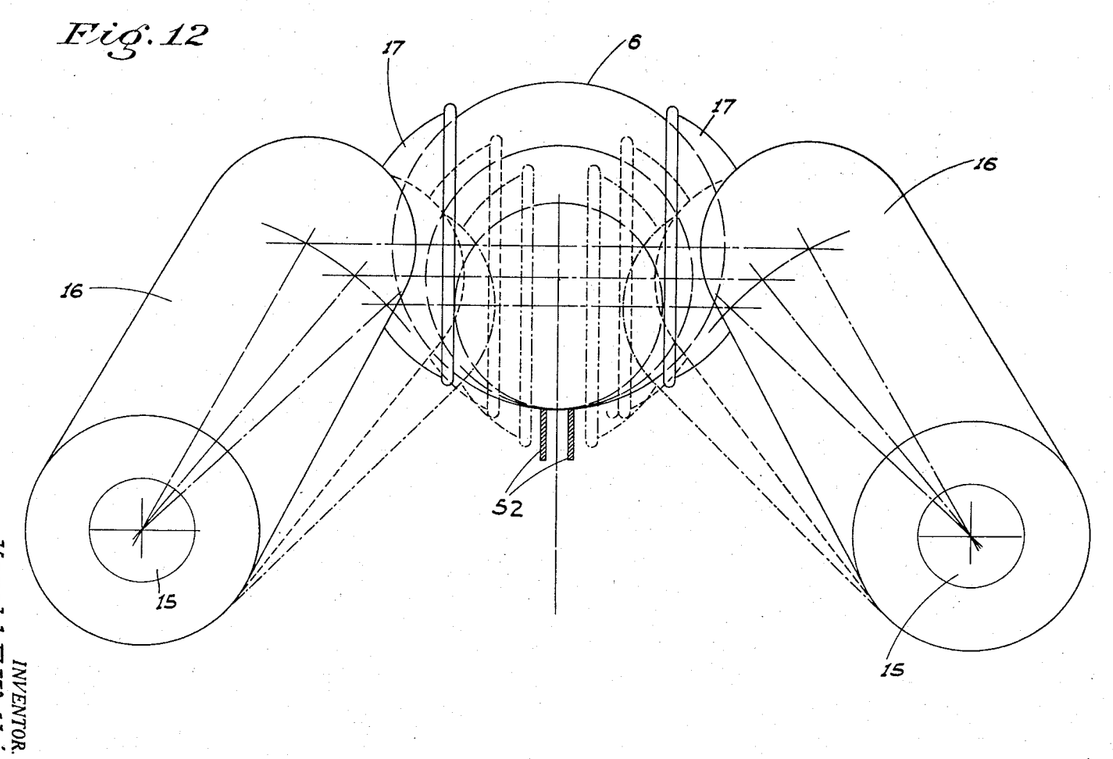
Figure 12 is a transverse diagrammatic view showing the positions occupied by the cups and their crank arms when engaging fruits of different sizes in the supporting cone.

Journaled in and projecting through bearing sleeves 14, mounted in the end wall 2, are tubular spindles 15 which—on their rear end—carry crank arms 16. Suction cups 17 for engaging the fruit are mounted on the outer end of the arms on transverse spindles 18 parallel to the spindles 15 and journaled in said arms. These cups are preferably constructed and suction controlled as shown in my Patent No. 2,177,967, dated October 31, 1939. The cups are disposed in facing relation to each other in line with the central transverse plane P of the fruit and cone unit, the spindles 15 being below the cone at such a level that the cups engage the fruit centrally therebetween when the arms are above the spindles, and are disposed in leaning or angled relation toward each other. The angular relation of the arms will obviously differ with fruits of different sizes, as indicated in Fig. 12, so that the horizontal center line of the cups and that of the fruit will aline irrespective of the size of the fruit. The manner in which this is effected will be seen later.

Figures 8, 9, 10, 11:
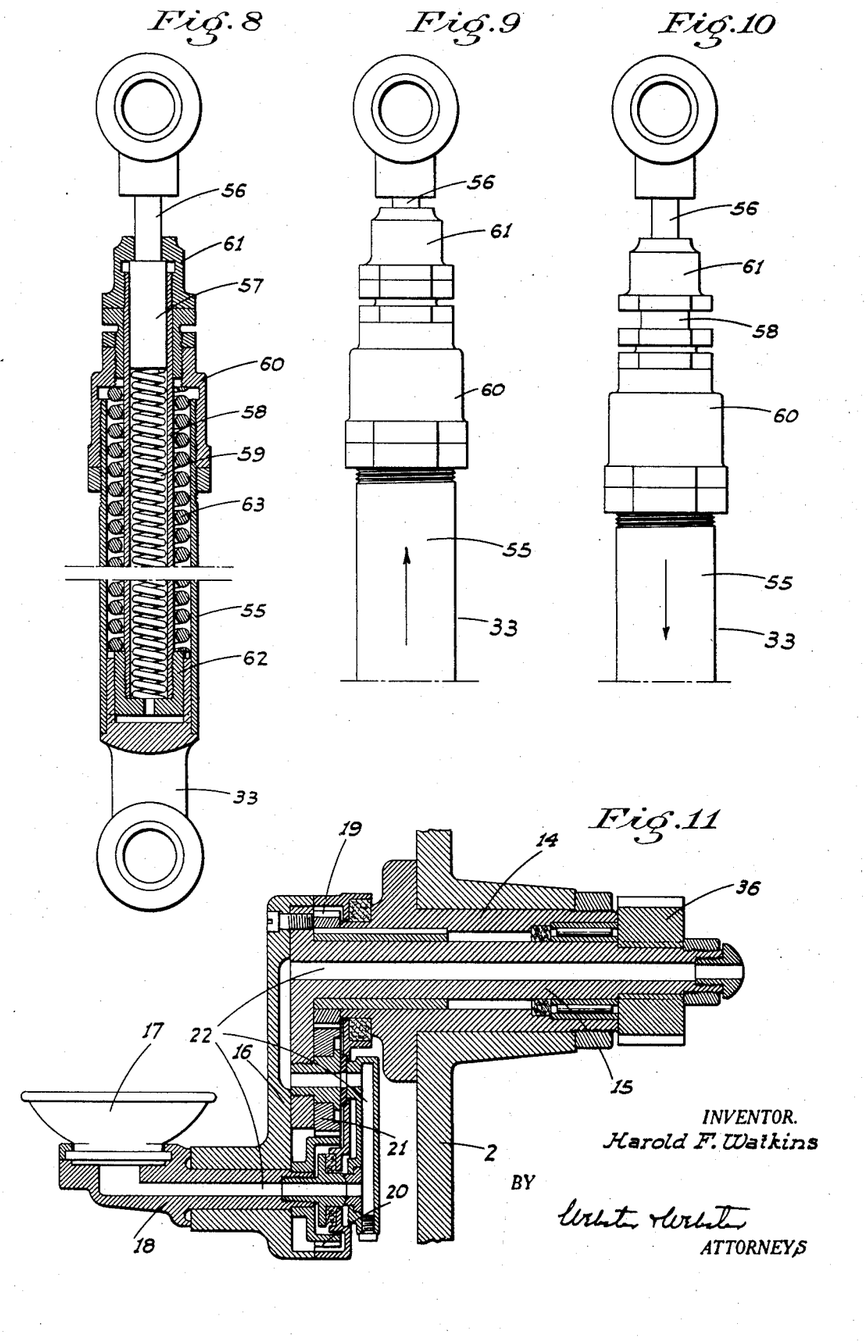
Figure 8 is a sectional elevation of the extensible and contractible link in its normal position.
Figure 9 is a fragmentary elevation of the link when contracted under compression.
Figure 10 is a similar view of the link when extended under tension.
Figure 11 is a sectional elevation of the fruit-cup supporting arm or crank unit.

As the arms swing away from each other and down, with the rotation of the spindles 15, the cups are maintained with their axes horizontal, by means of a train of gears in each arm, as shown in Fig. 11. One gear 19 is fixed on the stationary sleeve 14, another gear 20 the same size is fixed on the spindle 18, while the intermediate idler gear 21 is mounted in the arm itself. The spindles 15 and 18 and the arm 16 are arranged with a continuous passage 22 therethrough from the forward end of the spindle 15, so that connection with sources of negative and positive pressure may be made as and for the purpose described in my Patent No. 2,147,870.

The arms are rotated away from each other from a fruit engaging position to a substantially vertical depending position and vice versa, by means hereinafter described, and when lowered the horizontal axis of the cups is substantially alined with oppositely disposed juicing burrs 23 mounted on and connected by a common shaft 24 journaled in the extension 3. The burrs are here shown as being of conventional form, but are preferably of the special design shown in my Patent No. 2,181,442. The burrs are continuously driven while the machine is in operation by means of a spiral gear unit 25, connecting the shaft 24 and a shaft 26 projecting through the wall 2 into the main housing 1, and being there driven by any suitable means.

The shafts 4, the spindles 15, and the shaft 13 are oscillated in synchronized relation through arcs of predetermined length by the following means: Mounted in the housing 1 below and to one side of said shafts, but parallel thereto, is a constantly rotating drive shaft 27 fixed on which is a cam disc 28. On one side of this disc is an enclosed cam track 29 engaged by a roller 30 mounted on the lower leg of an upstanding bellcrank 31. This bellcrank overhangs the shaft 27 and is pivoted in the housing, as at 32, adjacent one side thereof. Upstanding links 33 are pivoted in common as at 34 on the outer end of the other leg of the bellcrank, which end is disposed adjacent the vertical central plane of the machine. These links are of special extensible and contractible construction and will be described in detail later. At their upper end the links are connected to segmental gears 35 pivoted in the wall 2 adjacent the sides thereof and engaging pinions 36 secured on the adjacent end of the spindles 15.

Another enclosed cam track 37 is disposed on the side of the disc 28 opposite the track 29, which track 37 is engaged by a roller 38 mounted on the lower end of an upstanding lever 39 pivoted intermediate its ends in the housing 1, as at 40. A link 41 extends transversely from the upper end of lever 39 and is connected to a segmental gear 42 which engages a pinion 43 on the shaft 13.

The disc 28 also has another enclosed cam track 44, radially inward from and on the same face of the disc as the track 37. The track 44 is engaged by a roller 45 mounted on the lower leg of a bellcrank 46, preferably pivoted in common with the bellcrank 31 but of course turnable independently thereof. The other leg of bellcrank 46 is connected to an upstanding link 47 which, at its upper end, is connected to one of a pair of meshing segmental gears 48 pivoted in the wall 2 below the shafts 4 and in more widely spaced relation. The gears 48 carry pins 49 parallel to the shaft 4 and engaging slotted links 50 connected to said shafts. These links are disposed so that when the cone halves supported by said shafts are in adjacent closing relation, the links extend directly away from each other.

Figure 1:
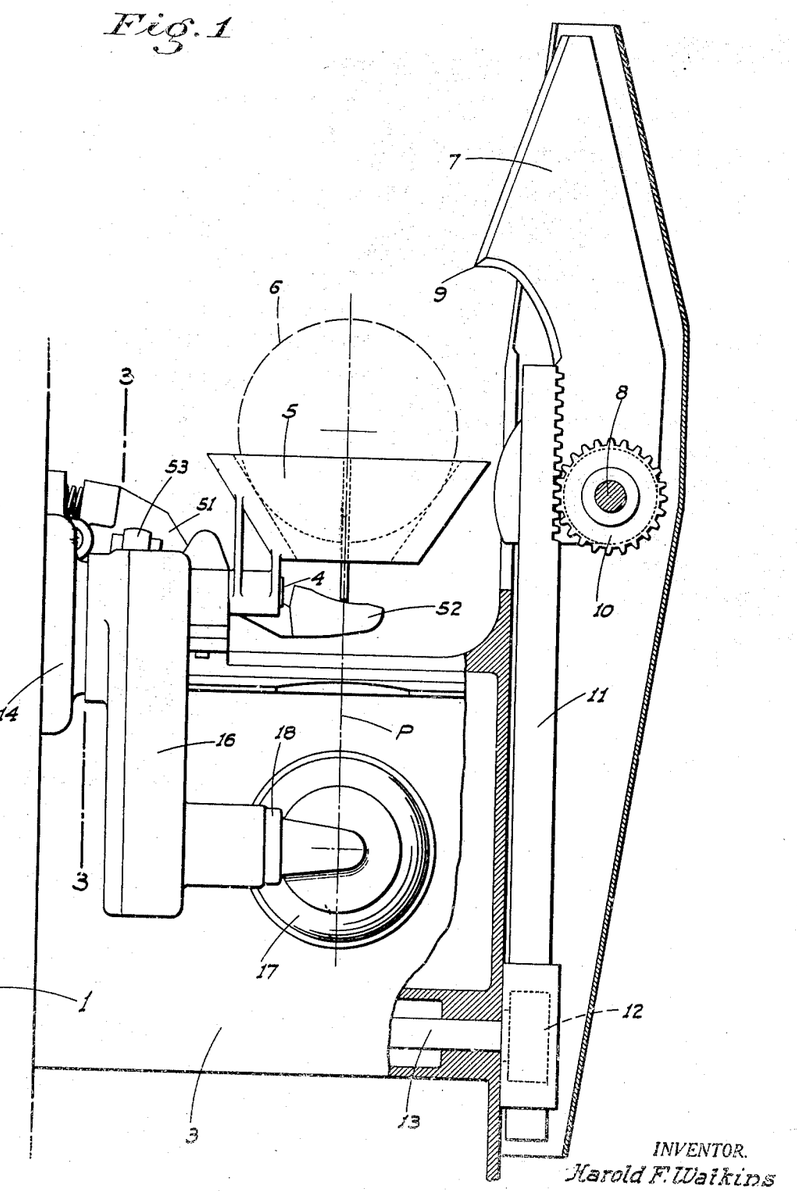
Figure 1 is a fragmentary side elevation of the machine partly in section, showing the cone in its fruit-receiving position, with the knife raised or inoperative and the fruit supporting cups in a juice extracting position.
Figure 2:
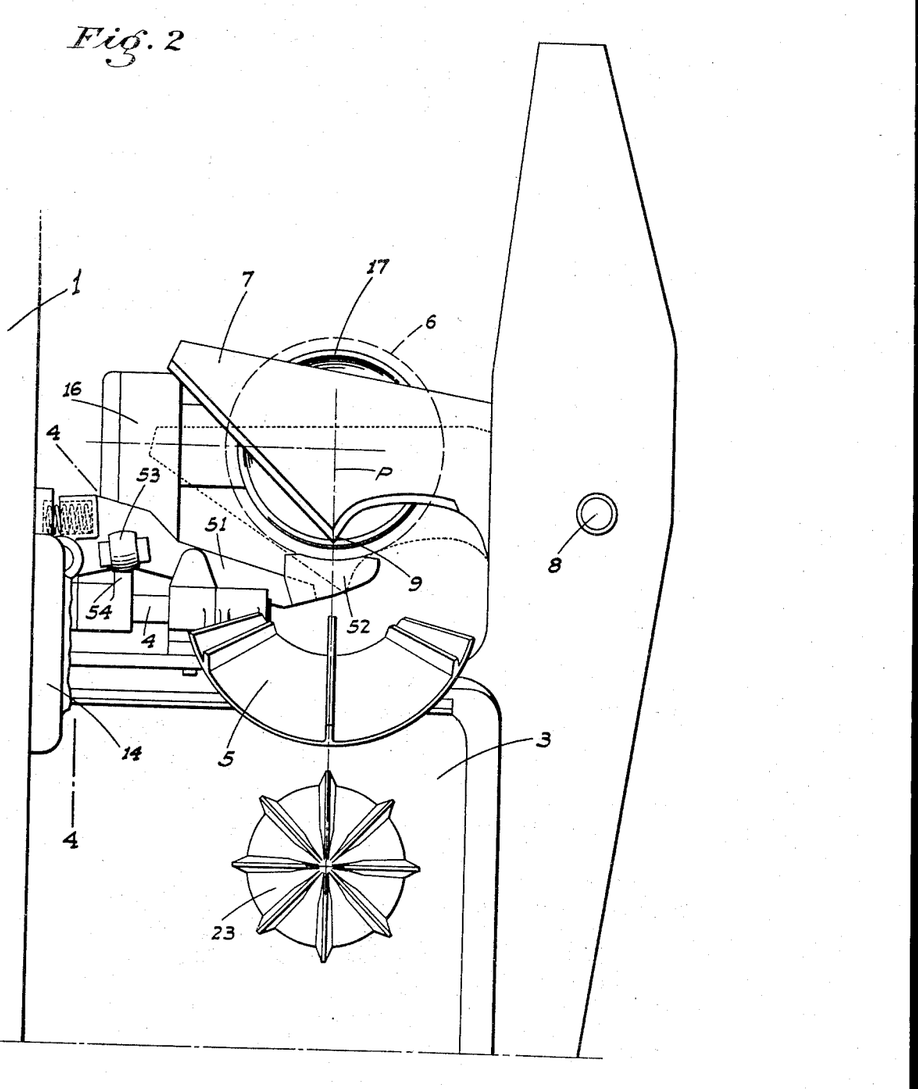
Figure 2 is a similar view showing the cone opened, the knife in a fruit severing position, and the cups in position to engage the fruit as it is cut, the inner cup arm being broken off.
Figures 5, 7:
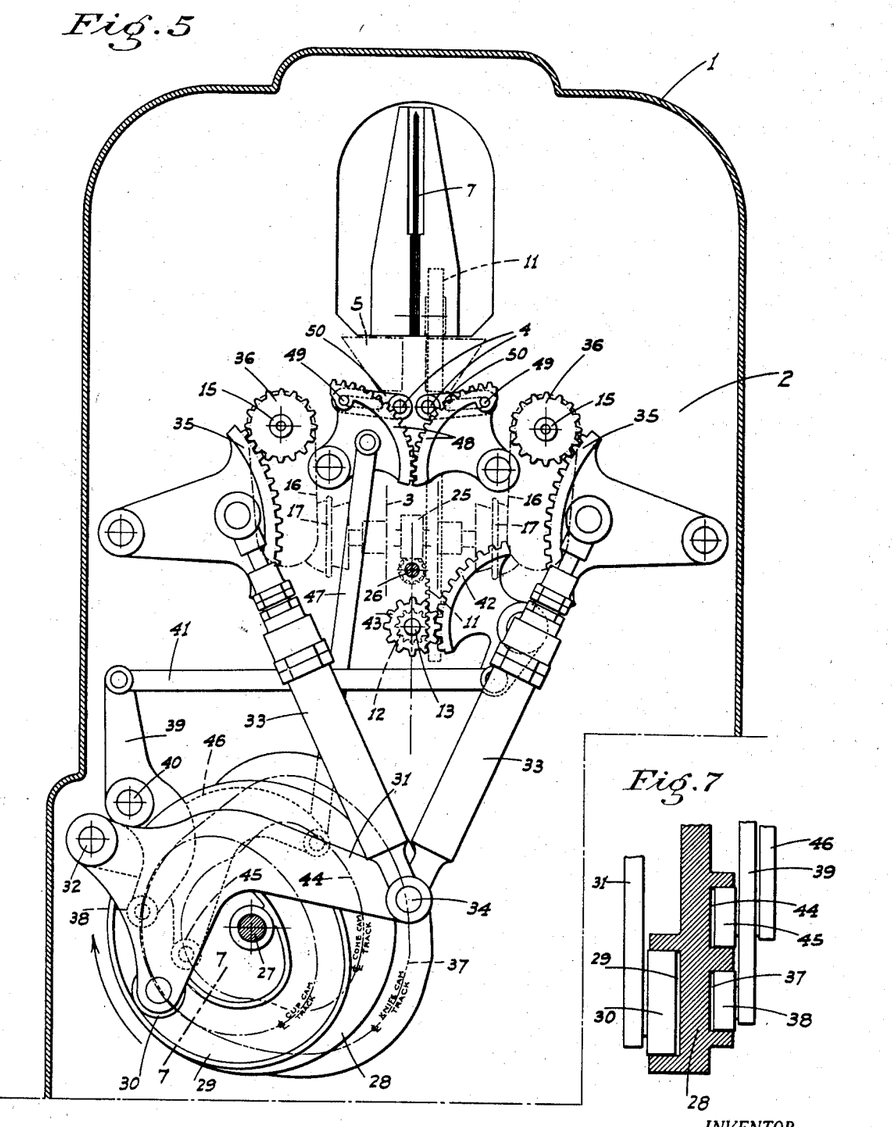
Figure 5 is a fragmentary transverse section of the machine showing the control mechanism for the fruit engaging parts, and in the positions occupied when such parts are disposed as in Fig. 1.
Figure 7 is a fragmentary radial section of the cam member on the line 7—7 of Fig. 5.
Figure 6:
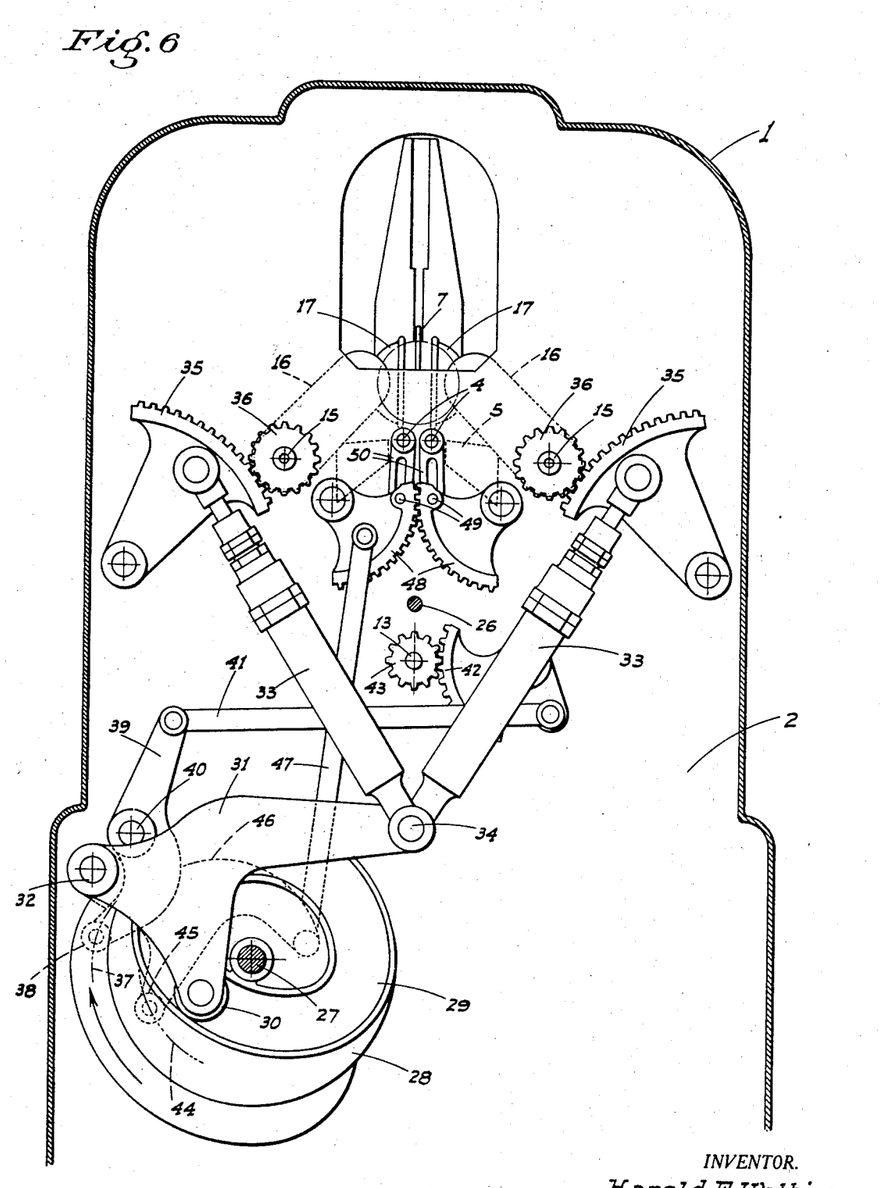
Figure 6 is a similar view showing the parts of the mechanism in the positions occupied when the fruit engaging parts are disposed as in Fig. 2.

The cam tracks and the parts controlled thereby, are arranged so that when the cups 17 are engaged with the burrs 23, the cone members 5 are in a fruit engaging position and the knife is raised, as shown in Figs. 1 and 5. With further rotation of the shaft 27 in a particular direction from this position of the cam tracks, the arms 16 first swing out and up, the cone elements temporarily remain stationary so as to properly support the fruit disposed therebetween, and the knife descends to a point short of its full stroke, or to the full line position of Fig. 2. The truncated cone elements then open while the knife remains stationary, and the cups 17 then immediately engage the exposed fruit on its opposite sides, which remains impaled on the knife, since the latter has not fully severed the fruit. The corresponding position of the control parts is shown in Fig. 6. The cups then remain halted, while the final movement of the knife takes place, the knife dropping to the position shown in dotted lines in Fig. 2. The cups then swing down, and while this is taking place the knife swings up out of the way while the truncated cone elements again close to receive the next fruit. As will be noted, the use of the slotted links 50, and their engaging pins 49 mounted in the oscillating segmental gears 48, enables the shafts 4 to be set quite close together, as is desirable, without directly connecting the shafts by gearing, which would have to be too small to be practicable.

In connection with the final movement of the knife, and to assure that the bottom layer of the fruit, after it has been pressed down by the knife, will be restored to or kept at the same level irrespective of the size of the fruit, I provide the following device:

Pivoted adjacent but outside the end wall 2 centrally between the shafts 4 is a rearwardly projecting arm 51, terminating in transversely spaced lifting plates 52 disposed under the cone elements centrally thereof. This arm on one side and rearwardly of its pivot carries a roller 53 engaging a cam 54 fixed on the adjacent shaft 4

Figure 3:
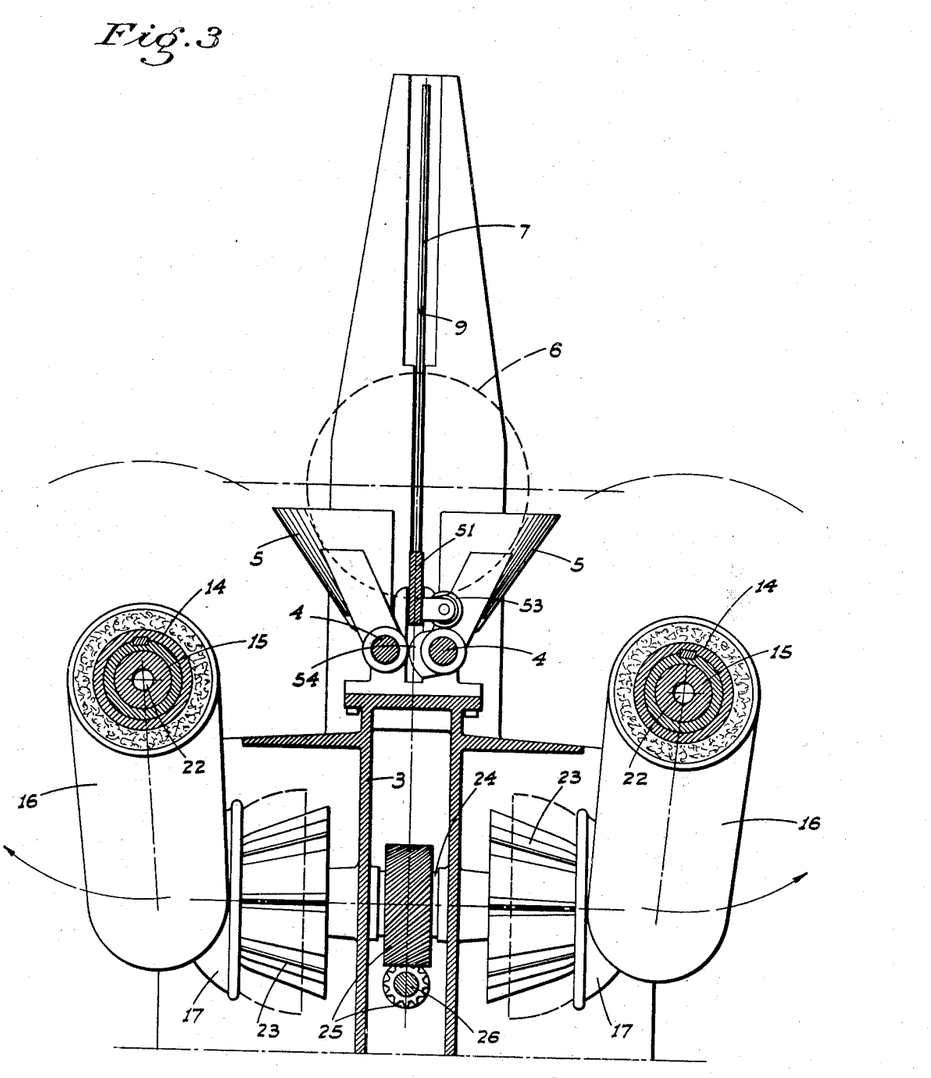
Figure 3 is a transverse section substantially on the line 3—3 of Fig. 1.
Figure 4:
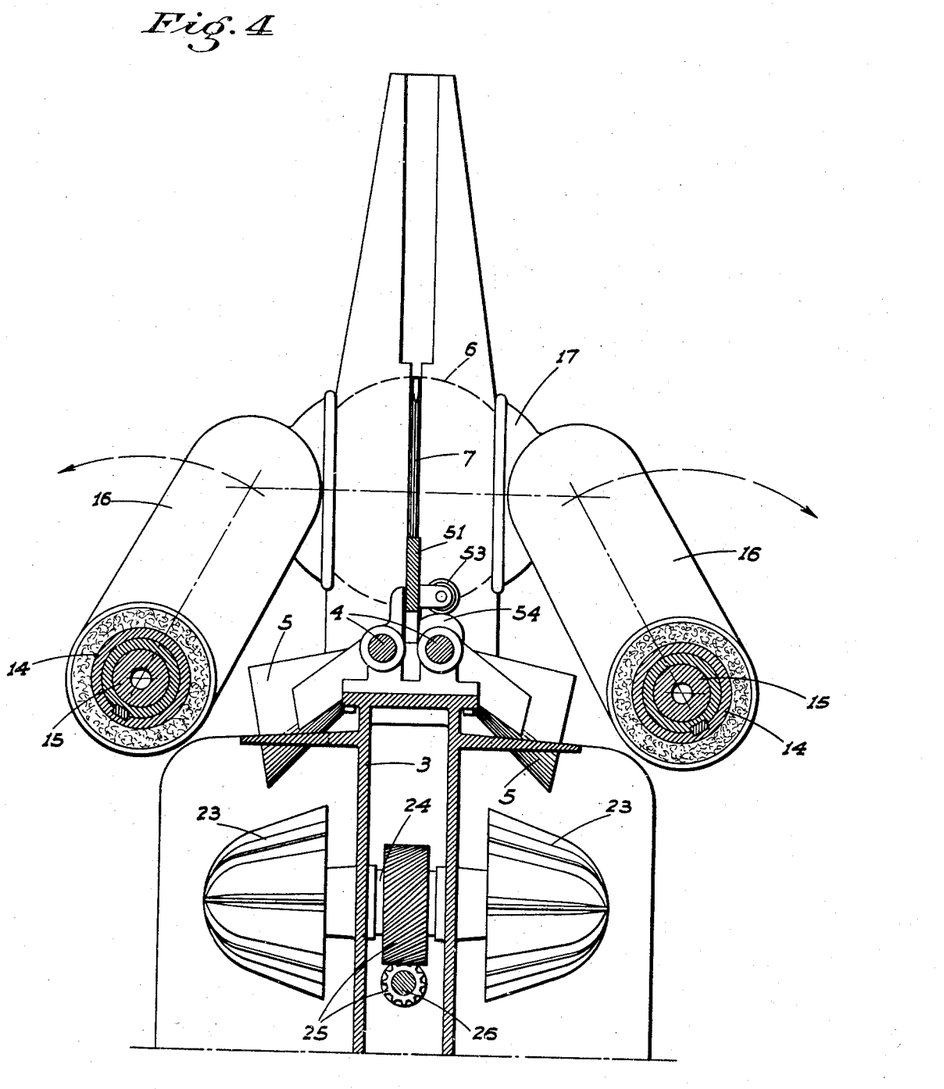
Figure 4 is a similar view on the line 4—4 of Fig. 2.

(see Figs. 3 and 4) and disposed so that as the shaft turns to open out or lower the corresponding cone element, the arm 51 will be raised a predetermined amount. This amount is sufficient to dispose the lifting plates 52 at the proper level to support the fruit regardless of its size when the cone unit is opened, the knife on the final stroke movement passing between the plates. The lifting plates raise the fruit, if necessary, against the knife as the latter descends, and always serve to support the fruit and restore the same if necessary to the proper level to cooperate with the cups 17.

In this manner fruit, regardless of its size, will always be disposed with its horizontal transverse center in substantial alinement with the horizontal center line of the cups 17 when the arms 16 are swung to cause the cups to engage the fruit, as shown in Fig. 12. This is because the pivotal spindles 15 of the arms are spaced sufficiently far apart that the arms always swing further toward each other than a perpendicular position before any fruit engagement is possible. Therefore the smaller the fruit and the lower the center thereof, the more must the arms swing beyond said perpendicular position, so as to engage the fruit with a corresponding drop of the center line of the cups.

The various cam tracks of course cause the corresponding bellcranks, etc., to move through strokes of fixed length. The arms 16 however can at times only swing different distances before they must halt on account of the different sizes of the fruit apt to be engaged thereby. This is true of both ends of the stroke of the arms, either when initially engaging the fruit or when presenting the cut halves to the burrs. Also, particularly when the fruit is held against the burrs it is desirable that a certain yielding pressure shall always be available to advance the fruit against the burrs as the juice is extracted.

The links 33 are therefore made so that they will contract as the cups reach their limit of possible movement when engaging the fruit and the links are under compression, and will be extended as the cups reach their limit of movement when cooperating with the burrs and the links are under tension; the arms 16 and the cups thereon being then subjected to yielding pressure under both conditions. The extreme possible movement of the cups as determined by the stroke of the cam track 29 is sufficient to dispose the cups slightly beyond a position at which they would engage the foremost fruit held in the cone.

The special construction of the links is as follows: Each link comprises an outer shell 55 whose lower end is connected to the bellcrank 31. The upper end of the link which is connected to the gear 35 comprises a stem 56 having an enlarged plunger 57 slidable in a sleeve 58 disposed within the shell, downward movement of the plunger in the sleeve being resisted by a compression spring 59 in the sleeve. An adjustable collar unit 60 is secured on the upper end of the shell and slides on the upper portion of the sleeve 58, being held against upward movement thereon by a cap 61 secured on the sleeve but slidable on the stem 56 above the plunger 57, and preventing upward movement of said plunger relative thereto. The sleeve 58 at its lower end is secured in an enlarged head 62 slidable in the shell, a compression spring 63 heavier than the spring 59 being disposed between said head and the collar 60.

In operation therefore it will be seen that if, with upper pressure on the shell, the upper end of the link—including the stem 56—resists further upward movement, the spring 59 will be compressed and the shell, including the collar 60 and the cap 61, will move up on the stem 56 as in Fig. 9, without any compression of the spring 63. At the same time the spring 59 is sufficiently strong to allow the opposite end portions of the link to move as a unit with the relative movement therebetween during the major portion of the movement of the link and parts connected thereto.

When, with a downward pull on the link, the upper end of the same is prevented from further movement beyond a certain position or limit, as determined by the size of the fruit held against the burrs, the shell and collar unit then pull away from the cap 61 as shown in Fig. 10. The spring 63 is then compressed and of course exerts a continuous pressure on the upper end of the link, through the head 62, the sleeve 58 and the cap 61, engaging the plunger 57. A yielding pressure is thus exerted on the cups so that the fruit will be automatically advanced slightly as the juice is extracted. The fact that each crank arm has its own link, which is yieldable independently of the other link, enables the arms to actually move different distances as irregularities in or differences in size of the corresponding fruit halves engaged by the fruit cups may necessitate.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a fruit juicing machine, an inverted truncated cone unit to initially support a fruit to be severed, said unit comprising a pair of separate cone elements and means mounting the elements for outward and downward movement, a knife to sever a supported fruit vertically in a plane between the cone elements, cups to engage the severed fruit on opposite sides when the cone elements are lowered, juicing burrs, means mounting the cups for movement from adjacent the cone elements to adjacent the burrs, means to actuate the cone mounting means including a pivoted lever having a cam engaging element thereon, means to actuate the knife including another pivoted lever having a cam engaging element thereon, means to actuate the cup mounting means including a third pivoted lever having a cam engaging element thereon, a rotary cam disc and separate cam tracks for the respective lever elements mounted on said disc.

2. In a fruit juicing machine, an inverted truncated cone unit to initially support a fruit to be severed, said unit comprising a pair of separate cone elements and means mounting the elements for outward and downward movement, a knife to sever a supported fruit vertically in a plane between the cone elements, cups to engage the severed fruit on opposite sides when the cone elements are lowered, juicing burrs, means mounting the cups for movement from adjacent the cone elements to adjacent the burrs, means to actuate the cone mounting means to lower the elements so as to expose the opposite sides of the fruit and means to actuate the cup mounting means so that the cups engage the fruit just after the cone elements are lowered.

3. In a fruit juicing machine, a support for an individual fruit, means to vertically halve the supported fruit, a pair of oppositely facing juicing burrs directly below the support and whose axis extends at right angles to the plane of severance, a pair of crank arms, transversely spaced horizontal and parallel pivots for one end of the arms extending lengthwise of the plane of severance in a horizontal plane intermediate the support and burrs, means to oscillate the arms through an outward arc of predetermined length, fruit engaging cups mounted on the outer end of the arms and facing each other to engage the fruit halves on opposite sides and means between the cups and arms to maintain the cups in such facing relation throughout the length of the stroke of the arms.

4. A structure as in claim 3, in which said last named means, for each cup, comprises a spindle on which the cup is mounted, the spindle being turnably supported in the corresponding arm parallel to the axis thereof, a gear secured on the spindle, another gear fixed axially of the arm and held against rotation, and an intermediate gear in the arm engaging both of the first named gears.

5. In a fruit juicing machine, a support for an individual substantially spherical fruit of varying size and maintaining the bottom of any such fruit on the same level, means to vertically halve a supported fruit, spaced and opposed juicing burrs below the support, a pair of crank arms pivoted at one end parallel to the plane of severance in a fixed position in transversely spaced relation in a horizontal plane below the support, facing horizontal-axis cups to engage the supported fruit halves on opposite sides, means mounting the cups on the arms for relative turning movement about an axis parallel to that of the arms, means to rotate the arms through a predetermined arc to move the cups from an initial fruit engaging position to a burr cooperating position, and means between the arms and cup mounting means to maintain the axis of the latter horizontal with rotation of the arms; the axis of each arm being so disposed relative to the radial distance from such axis and that of the cup mounting means, and to the support, that the arm will move through a descending path toward the fruit before the cup contacts the same and the axis of the cup substantially alines with the horizontal axis of the fruit irrespective of the size thereof.

6. A structure as in claim 3, in which said arm oscillating means includes, for each arm, a push and pull link contractible and extensible respectively when movement of the arm is resisted by a predetermined pressure.

7. In a juicing machine for substantially spherical fruit, an inverted truncated cone unit to support individual fruits of different sizes therein and comprising separable elements and means to swing the elements apart and down to expose opposite sides of the fruit, a knife movable to sever the fruit in half vertically in a plane between the cone elements, cups to engage the severed fruit on opposite sides when the cone elements are swung down and clear of the fruit and means functioning upon such swinging movement of the cone elements to then support the fruit with its lower edge at a fixed level irrespective of the size of the fruit.

8. In a fruit juicing machine for substantially spherical fruit, an inverted truncated cone unit to support individual fruits and comprising separable elements and means to swing the elements apart and down to expose opposite sides of the fruit, a knife mounted in position to sever the fruit in half vertically in a plane between the cone elements, cups to engage the severed fruit on opposite sides when the cone elements are swung down clear of the fruit, means to operate the knife so that it projects only part way through the fruit before the cone elements swing down, dwells while such swinging is in progress and while the cups are engaging the fruit, and then moves to completely sever the fruit, and means functioning upon such swinging movement of the cone elements to support the fruit at a predetermined level while the final severing thereof by the knife is being effected.

9. In a juicing machine for substantially spherical fruit, an inverted truncated cone unit to support individual fruits of different sizes therein and comprising separable elements and parallel, turnable shafts below and connected to the cone elements, means to turn the shafts in opposite directions to swing the cone elements out and down from a fruit supporting position to expose the opposite sides of the fruit, a knife movable to sever the fruit vertically in a plane between the cone elements, cups to engage the severed fruit on opposite sides when the cone elements are swung down, a pivoted arm disposed below the cone elements and parallel to and between the shafts, a fruit supporting plate on the arm centrally of the cone unit, a cam on one shaft and a cam engaging element on the arm overhanging the cam; the cam being disposed to engage the element and lift the arm upon rotation of the shaft in a direction to swing the cone element down and being calculated to cause the plate to lift to a predetermined level.

10. In a fruit juicing machine, an inverted truncated cone unit to initially support an individual fruit, a knife movable vertically to halve the supported fruit, and means to engage the fruit on opposite sides when halved; the unit comprising separate cone elements spaced apart on opposite sides of the knife, turnable shafts parallel to the knife disposed below and connected to the cone elements, and means to rotate the shafts in opposite directions to swing the cone elements out and down to clear the fruit and expose the opposite sides thereof to said engaging means.

11. A device as in claim 10 in which the shafts are relatively close together, and said rotating means comprises slotted links projecting from the shafts in symmetrical relation to each other, a pair of meshing gears disposed symmetrical to the links and shafts, means connected to one gear to oscillate the same and pins projecting from the gears and movable in the slots of the links.

12. A structure as in claim 3, in which the arm oscillating means comprises a single rotatable cam member, a pivoted lever having a cam engaging element, a pair of links pivoted at one end in common on said lever, and connections between the opposite end of the links and the two crank arms to impart oscillating movement thereto with push and pull movement of the links.

HAROLD F. WATKINS.